(12) United States Patent
Kleinberger

(10) Patent No.: US 6,699,445 B2
(45) Date of Patent: Mar. 2, 2004

(54) INTEGRATED COLUMN FOR LIQUID-LIQUID CONTACTING

(75) Inventor: Rafael Kleinberger, Zichron Yaacov (IL)

(73) Assignee: Bateman Advanced Technologies Ltd., Yokneam (IL)

(*) Notice: Subject to any disclaimer, the term of this patent is extended or adjusted under 35 U.S.C. 154(b) by 306 days.

(21) Appl. No.: 09/930,438

(22) Filed: Aug. 16, 2001

(65) Prior Publication Data

US 2003/0035767 A1 Feb. 20, 2003

(51) Int. Cl.[7] ................................................ B01D 11/04
(52) U.S. Cl. ...................... 422/257; 422/256; 210/634; 210/744; 210/97; 210/194; 210/197; 210/256; 210/261; 210/511
(58) Field of Search ................................ 422/256, 257; 210/634, 739, 744, 97, 194, 197, 252, 256, 261, 262, 511

(56) References Cited

FOREIGN PATENT DOCUMENTS

FR     2486811 A1  *  1/1982

* cited by examiner

*Primary Examiner*—Elizabeth McKane
(74) *Attorney, Agent, or Firm*—Mark M. Friedman

(57) ABSTRACT

The present invention provides a system for, and method of, performing various liquid-liquid contacting operations such as solvent extraction, stripping, scrubbing, washing, re-extraction and reacting in a single, integrated column. The ability of the integrated column, which is based on the intermediate decanter, of the present invention, to perform the entire operation of solvent extraction plant in a single column has many technical, economical, ecological and operational safety advantages. Investment costs significantly decrease due to the decrease in the number of columns, decanters, and auxiliary equipment, spare parts, materials inventories and the requisite area for the plant relative to a standard prior art plant. Operating and maintenance costs also decrease due to less pumping between columns and less equipment in operation.

38 Claims, 6 Drawing Sheets

INTEGRATED COLUMN FOR LIQUID-LIQUID CONTACTING

FIELD AND BACKGROUND OF THE INVENTION

The present invention relates to liquid-liquid contacting columns for solvent extraction, stripping, scrubbing, washing, re-extraction and similar operations, and in particular it concerns a liquid-liquid contacting column for effecting multiple operations using a novel intermediate decanter.

It is known that the purpose of liquid-liquid contacting columns for solvent extraction is to recover solute dissolved in one liquid phase, usually an aqueous phase, by extracting the solute with a suitable solvent, usually an organic phase as the other liquid phase, and which becomes the extract. Optionally and typically, the extract is subsequently purified or scrubbed by a suitable scrubbing agent (usually another aqueous phase) to remove undesired contaminants. This unit operation is often followed by a stripping or re-extraction stage in which a suitable stripping agent (usually another aqueous phase) is used to recover the purified product.

In defining a stage as the combined operation of contacting the two participating liquids, allowing them to reach equilibrium by mixing and mechanically separating them by settling, it follows that solvent extraction is, basically, a multi-stage process. Any mixer and settler can be combined to produce one solvent extraction stage, and stages can be arranged in a multi-stage battery.

Many arrangements have been invented in an effort to reduce inter-stage operational volumes, pumping and costs. Some examples are the "Box"-type described by Coplan et al., Chem. Eng. Prog. 50, 403 (1954), or a further modification described by Hazen et al., Min. Eng. 994 (1957), among others.

Other approaches to solvent extraction have been suggested, such as U.S. Pat. No. 3,017,253 to Coleby, which teaches a Graesser extractor that is based on an horizontal shell with a series of buckets revolving around an inner shaft dropping droplets of one liquid through the other.

A more advanced equipment category for solvent extraction allows continuous and differential operation. The equipment in this category is usually arranged for multi-stage, countercurrent contact of the two participating liquids, without complete repeated separation of the liquids between adjacent stages. Instead the liquids remain in continuous contact while flowing through the equipment. Typical examples of this category are the various types of extraction columns.

Countercurrent flow is maintained in the equipment by the difference in densities of the liquids and the force of gravity. Both liquids are pumped through the equipment at any desired linear velocity and selected phase ratio.

In many cases, the density difference between the liquids is insufficient to disperse one liquid in the other and to keep turbulence at the requisite level for efficient mass transfer. Various mechanical stirring or pulsation devices may apply additional energy needed for reaching the desired turbulence. U.S. Pat. No. 2,601,674 to Reman et al., for instance, relates to a rotary disk contactor, which is an example of a mechanical stirred continuous device, while U.S. Pat. No. 2,011,186 to Van Dijk is an example of a pulsed column.

In pulsed columns, a reciprocating motion is applied to the main column cylindrical section to agitate the liquids, provide the desired turbulence and thus improve the rate of mass transfer. Reciprocating plungers or pistons can be used as pulsing devices. A more current approach uses air pulsing devices. Beneath and beyond the extraction column cylindrical section, in which the mass transfer takes place, there are usually placed settling decanters, each of a suitable volume, for proper separation of each of the two liquid phases. The clear light phase flows out the top of the column and the clear heavy phase flows out the bottom.

As described briefly above, solvent extraction is often followed by purifying or scrubbing the extracted phase from undesired contaminants, and by recovering the purified product by stripping. Performing these tasks necessitates at least one, usually more, additional columns, and additional equipment such as settling decanters, holding tanks, pumps, control devices, pulsing means, etc.

Theoretically, appreciable savings in equipment and energy (as well as improvements in process ecology in many applications) could be achieved by building a single column in which multiple process stages are integrated. However, although feeding an extraction column via an intermediately disposed feed port is relatively straightforward, the selective removal of a given phase via an intermediately disposed discharge port is, to the best of our knowledge, unknown in the art, and has certainly not seen widespread commercial implementation. Moreover, to date, there is no known prior art system for and method of, performing several countercurrent operations in series in a single column.

There is therefore a recognized need for, and it would be highly advantageous to have, a system for, and a method of, solvent extraction that has the ability to extract and purify and recover materials in a single, integrated column.

SUMMARY OF THE INVENTION

The present invention is a system for, and a method of, liquid-liquid contacting for performing solvent extraction and stripping, scrubbing and similar additional operations, in a single, integrated column.

According to the teachings of the present invention there is provided an intermediate decanter in a liquid-liquid contacting system. The decanter, disposed between an upper contacting column and a lower contacting column, includes: (a) a housing having: (i) a top opening communicating with the upper column; (ii) a bottom opening communicating with the lower column; and (iii) a decanter outlet designed and configured for discharging a substantially heavy phase. The intermediate decanter further includes: (b) a first partition within the housing forming a first settling chamber and a second settling chamber. The first partition is designed and configured within the housing so as to direct a flow of a substantially light phase received from the lower column through the second settling chamber, wherein the light phase is separated from the heavy phase of the lower column, into the first settling chamber, wherein the light phase is separated from the heavy phase of the upper column. The heavy phase is in communication with the decanter outlet, for discharge thereto, and the light phase is in communication with the upper column, for discharge thereto.

According to another aspect of the present invention there is provided an integrated column for performing a plurality of liquid-liquid contacting functions. The column includes: (a) an upper column section; (b) a lower column section, and (c) an intermediate decanter fluidly connecting between the upper column section and the lower column section. The intermediate decanter includes: (i) a housing having: (A) a top opening communicating with the upper column section;

(B) a bottom opening communicating with the lower column section, and (C) a decanter outlet designed and configured for discharging a substantially heavy phase therefrom. The intermediate decanter further includes: (ii) an inner workings including: a first partition designed and configured within the housing so as to form a first settling chamber and a second settling chamber, and so as to direct a flow of a substantially light phase received from the lower column section through the second settling chamber, wherein the light phase is separated from the heavy phase of the lower column section, and into the first settling chamber. In the first settling chamber the light phase is separated from the heavy phase of the upper column section and discharged through to the upper column section, while the heavy phase is discharged though the decanter outlet.

According to yet another aspect of the present invention there is provided an integrated column for performing a plurality of liquid-liquid contacting functions. The column includes a plurality of units, each including: (a) a column section, and (b) an intermediate decanter fluidly connected to a first end of the column section. These units are attached in series, such that each intermediate decanter in the integrated column is connected to an upper column section and a lower column section. Each intermediate decanter includes: (i) a housing having: (A) a top opening communicating with the upper column section; (B) a bottom opening communicating with the lower column section, and (C) a decanter outlet designed and configured for discharging a substantially heavy phase therefrom. Each intermediate decanter further includes: (ii) an inner workings having: a first partition designed and configured within the housing so as to form a first settling chamber and a second settling chamber. The first partition designed and configured to direct a flow of a substantially light phase received from the lower column section through the second settling chamber, wherein the light phase is separated from the heavy phase of the lower column section, and into the first settling chamber. In the first settling chamber the light phase is separated from the heavy phase of the upper column section and discharged through to the upper column section, while the heavy phase is discharged though the decanter outlet.

According to still another aspect of the present invention there is provided a method for performing a plurality of liquid-liquid contacting operations in an integrated column. The method includes the steps of: (a) providing an integrated column including: (i) an upper column section; (ii) a lower column section, and (iii) an intermediate decanter fluidly connecting between the upper column section and the lower column section. The intermediate decanter including: (A) a housing having: (I) a top opening communicating with the upper column section; (II) a bottom opening communicating with the lower column section, and (III) a heavy phase outlet, and (B) a first partition disposed within the housing forming a first settling chamber and a second settling chamber; (b) flowing a light phase through the lower column section and through the upper column section via the second settling chamber and the first settling chamber; (c) performing a first liquid-liquid contacting operation in the upper column section by passing a first heavy phase through the upper column section to the first settling chamber, and (d) selectively removing the first heavy phase from the heavy-phase outlet.

According to one feature of the present invention, the first partition of the intermediate decanter is further disposed within the housing such that the light phase is separated in the second settling chamber from a second heavy phase, which is fed to said lower column.

According to another feature of the present invention, the first partition is attached to the housing so as to fluidly separate the intermediate decanter between a bottom region of the first settling chamber and a second bottom region of the second settling chamber.

According to further features in the described preferred embodiments, the first partition is attached to the housing so as to fully separate between the light phase in the second settling chamber and the heavy phase disposed in the first settling chamber and in fluid communication with the decanter outlet.

According to still further features in the described preferred embodiments, the first settling chamber has a liquid-liquid interface, below which is disposed the substantially heavy phase, and the intermediate decanter further including means for controlling a level of the interface.

According to yet further features in the described preferred embodiments, the means for controlling is designed to maintain the level below a pre-determined height of the first partition.

According to yet further features of the invention, the first partition is attached to the housing so as to fully separate between the light phase in the second settling chamber and the heavy phase disposed below the interface.

According to yet further features of the invention in the described preferred embodiments, at least a portion of the first partition is sloped.

According to still further features in the described preferred embodiments, the intermediate decanter also has a second partition disposed in a spaced relationship to the top section of the first partition. The second partition forms thereby a channel for passage of the substantially light phase from the second settling chamber into the first settling chamber.

According to still a further feature of the present invention, the means for controlling is designed to maintain the level at a pre-determined height below the second partition.

According to still a further feature of the present invention, the second partition is designed and configured to be length-adjustable.

According to still a further feature of the present invention, the second partition is designed and positioned to inhibit the substantially heavy phase of the upper column section from passing between the second partition and the housing and into the second settling chamber.

According to yet a further feature of the present invention in the described preferred embodiments, the intermediate decanter further includes at least one opening for attaching a level control instrument.

According to yet a further feature of the present invention in the described preferred embodiments, the intermediate decanter further includes at least one additional opening for attaching indicating instruments and control instruments.

According to yet a further feature of the present invention, the intermediate further includes at least one additional opening, disposed in the housing near a top of the second settling chamber, for releasing of air trapped below the second partition.

According to still further features of the present invention, the intermediate decanter further includes at least one additional opening disposed in the housing near the bottom of the first settling chamber, for draining any liquid in the first settling chamber.

According to still further features of the present invention, the integrated column further includes means for flowing the substantially light phase from the lower column section, through the intermediate decanter, and into the upper column section.

According to still further features of the present invention in the described preferred embodiments, the integrated column further includes a pulsation system including at least one pulsation generator, each connected to the integrated column, the pulsation system for promoting liquid-liquid contacting.

According to still further features of the present invention, the method further includes the step of performing a second liquid-liquid contacting operation in the lower column section by flowing a second heavy phase through the lower column section.

According to yet further features of the present invention, substantially all of the second heavy phase flowing into the second settling chamber by entrainment is settled in the second settling chamber.

According to yet further features of the present invention, the method further includes the step of controlling a liquid-liquid interface within the first settling chamber.

According to still further features of the present invention in the described preferred embodiments, the method further includes the step of providing a second partition disposed in a spaced relationship to the top section of the first partition, the second partition forming thereby a channel for passage of the substantially light phase from the second settling chamber into the first settling chamber.

According to still further features of the present invention in the described preferred embodiments, the method further includes the step of disposing the first partition within the housing so as to fluidly separate between a first bottom region of the first settling chamber and a second bottom region of the second settling chamber.

According to still further features of the present invention, the flowing of the first heavy phase through the upper column section is achieved by gravitation.

According to still further features in the described preferred embodiments, the first liquid-liquid contacting operation is selected from the group consisting of extraction, scrubbing, stripping, washing, re-extraction and reacting.

According to still further features of the present invention in the described preferred embodiments, the second liquid-liquid contacting operation is selected from the group consisting of solvent extraction, scrubbing, stripping, washing, re-extraction and reacting.

According to a further feature of the present invention in the described preferred embodiments, the first liquid-liquid contacting operation and the second liquid-liquid contacting operation are different contacting operations.

The present invention successfully addresses the shortcomings of the existing technologies by providing a system for, and method of, liquid-liquid contacting for performing various liquid-liquid contacting operations such as solvent extraction, stripping, scrubbing, washing, re-extraction and reacting in a single, integrated column. The ability of the integrated column, which is based on the intermediate decanter of the present invention, to perform the entire operation of solvent extraction plant in a single column has many technical and economical advantages. Investment costs significantly decrease due to the decrease in the number of columns, decanters, and auxiliary equipment: tanks, pumps, piping, pulsation systems, control instruments etc., and therefore, spare parts and materials inventories are also reduced relative to a standard prior art plant. At the same time, the requisite area for the plant is substantially reduced. Operating and maintenance costs also decrease due to less pumping between columns and less equipment in operation. In addition, operational safety and ecology are improved due to less solvent volumes required for the integrated column as compared to two, or more separate columns of same functionality, and simpler operation and control.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
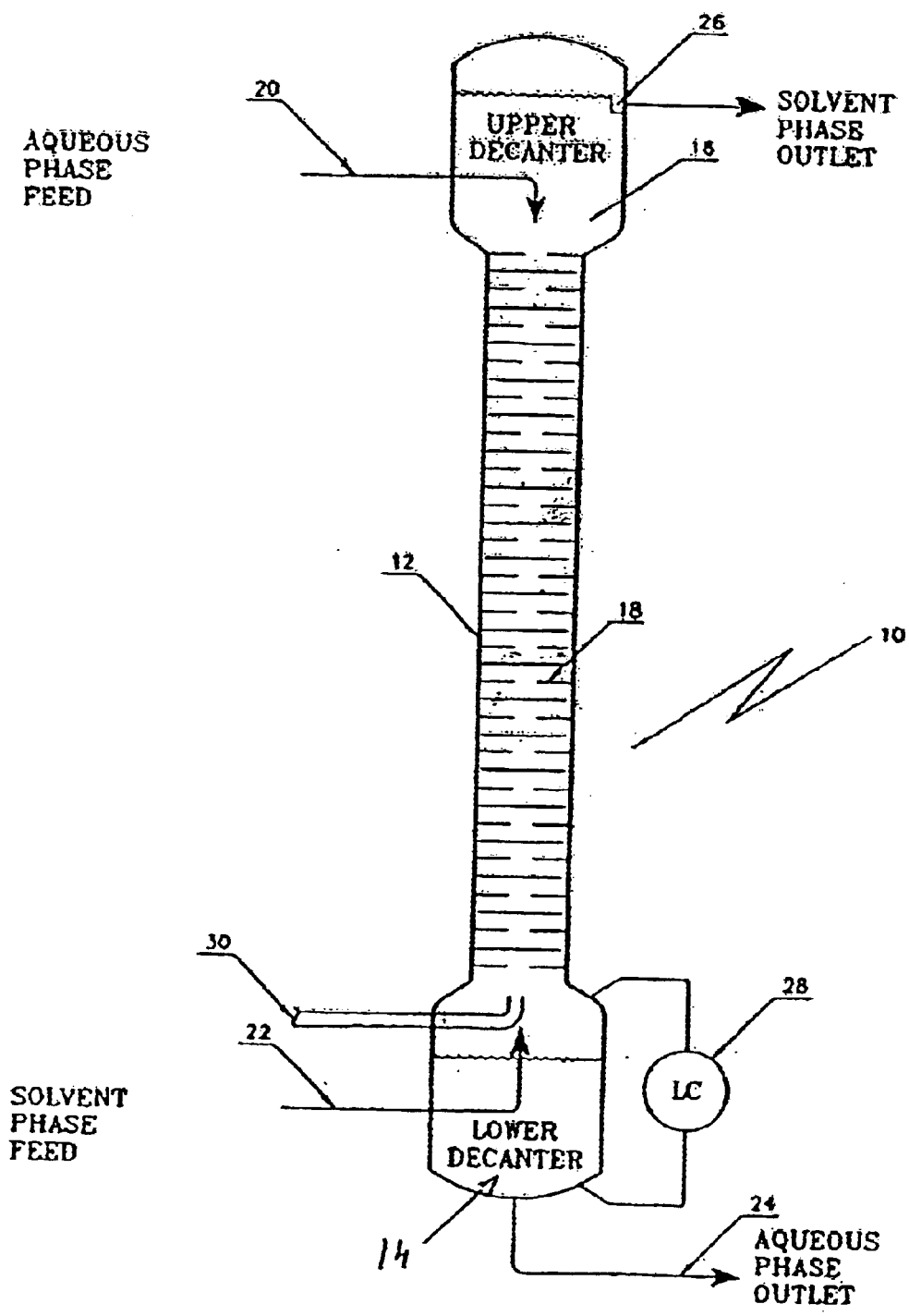
FIG. 1 is a schematic diagram of a standard, prior art, solvent extraction pulse column.

The present invention is a system for, and a method of, liquid-liquid contacting for performing solvent extraction and stripping, scrubbing and similar additional operations, in a single, integrated column.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Referring now to the drawings, FIG. 1 is a schematic diagram of a standard pulse column for solvent extraction of the prior art.

Column 10 consists of a vertical cylindrical extracting section 12, connected to a lower decanter 14 and an upper decanter 16. Extracting section 12 typically has a diameter of 0.1 to 5 meters and a height of 2 to 35 meters, and is typically filled with packing elements 18. Common packing elements 18 are plates (typically sieve plates), or more often metal, plastic, or other suitable material, arranged as a series of disks and doughnuts elements. The height and diameter of extraction section 12, the free cross-sectional area for flow, and the spacing between packing elements 18, depend, inter alia, on the characteristics of the participating liquid phases, required flow rates and fluxes.

The respective heights and diameters of lower decanter 14 and upper decanter 16 are calculated to ensure sufficient residence time for the separation of the two phases and to minimize entrainment of solvent in the aqueous phase at the bottom of a column and of aqueous phase in the solvent at the top of a column. Typically, the diameter of both lower 14 and upper decanter 16 is equal to or up to twice the diameter of extraction section 12, and the height is 2 to 6 times the diameter of extraction section 12.

During operation, the heavy liquid phase (aqueous, by way of example) to be extracted enters column 10 through a first feed line at a top 20 of contacting section 12, while a light liquid phase (e.g., an organic solvent such as ethanol) enters through a second feed line 22 at a bottom of contacting section 12. The spent heavy phase, also known as raffinate, is removed at a bottom 24 of lower decanter 14, and the light enriched organic solvent, also known as extract, flows out through a weir 26 in upper decanter 16. Level control devices 28 are usually used to maintain the interface level in either lower 14 or upper decanter 16, depending on which phase is the continuous phase with the other phase being the dispersed phase.

Typical materials of construction for standard columns 10 are composite materials such as glass-reinforced polyester, plastics such as polypropylene, polyvinylidene di-fluoride, polyvinyl chloride, and metals including various stainless steels, titanium and more.

Optionally, column 10 can be equipped with a pulsation system connected to the bottom of the column 10 at point 30. This pulsation system can be of many varieties known in the art, including, without being limited to, a reciprocating plunger, a piston pump or air pulsing devices.

In recovery processes, extractions are usually followed by at least one additional stage for purifying or scrubbing of the extracted phase from other and/or remaining undesired contaminants, and by at least one additional stage for recovering the product by stripping. Performing these operations require, according to the prior art, at least one, usually more, additional columns and auxiliary equipment such as decanters, buffering storage tanks, pumps, and various control instruments.

Figure 2:
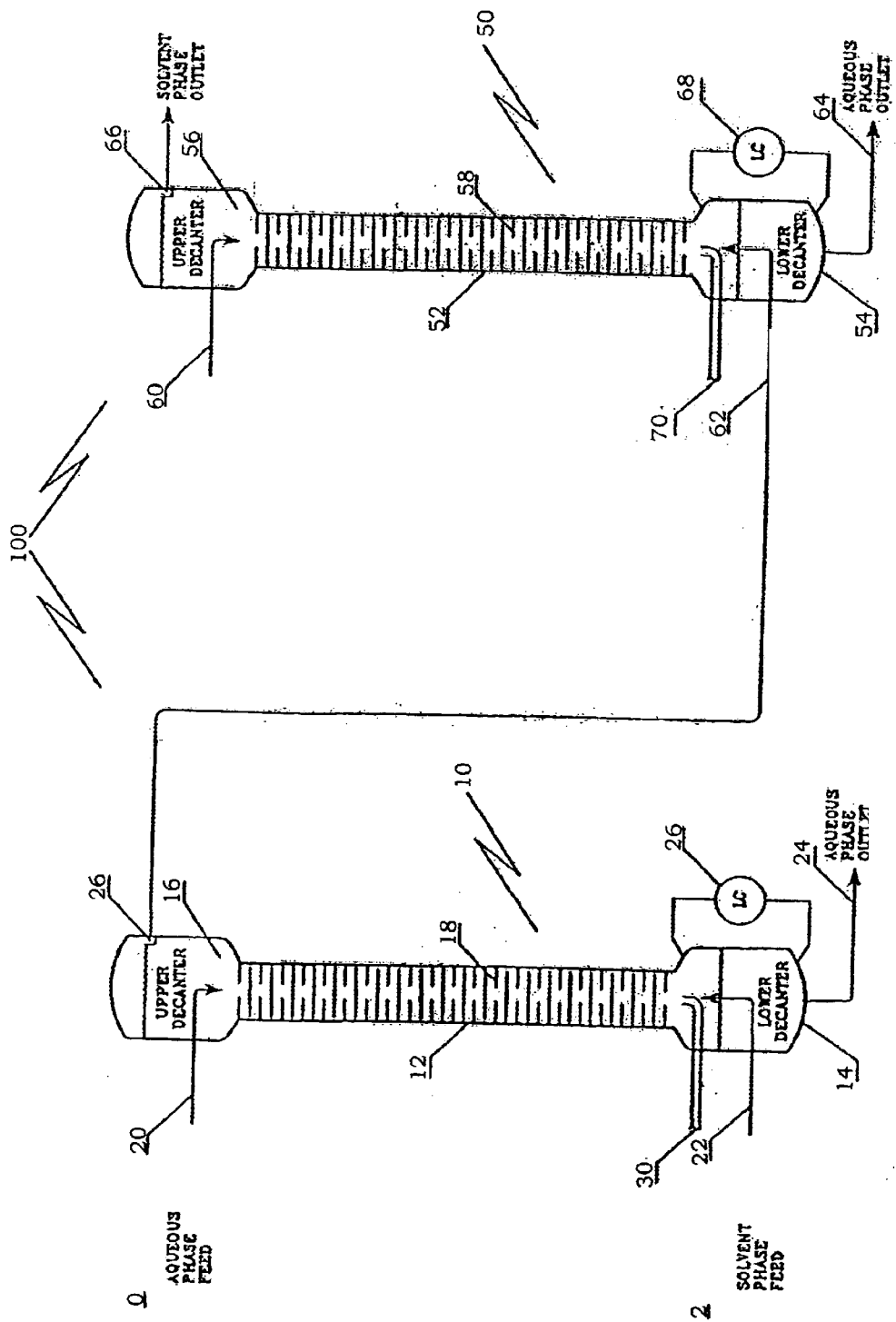
FIG. 2 is a schematic diagram of a standard prior art system, consisting of a column for solvent extraction and another column for scrubbing or stripping of the extracted phase.

FIG. 2 demonstrates a schematic diagram of a simple standard prior art extraction and stripping system 100, system consisting of two columns, an extraction column 10 for solvent extraction, and a stripping column 50 for stripping of the extracted phase.

Extraction column 10 is identical to the column described in FIG. 1, and stripping column 50, may also be similar to extraction column 10, but is not necessarily of the same dimensions.

It should be noted that in FIG. 2, the requisite intermediate equipment for operating columns 10 and 50 in series, (decanters, tanks, pumps, etc.) is not shown.

Stripping column 50, similarly to extraction column 10, has a vertical cylindrical stripping section 52 filled with packing elements 58. Stripping section 52 is connected to a lower decanter 54 and an upper decanter 56.

In typical (schematic) operation, the solvent extract leaving extraction column 10 through outlet 26, is transferred into column 50 through inlet 62 and is contacted with a second aqueous phase, which enters column 50 at the top through inlet 60.

The already stripped solvent overflows from column 50 via a weir 66 in the upper decanter 56, and may be subsequently recycled to extraction column 10. The flow of stripped solvent, in that case, may be recycled along with fresh make up solvent, through the bottom 22 of extraction column 10.

The aqueous phase leaves system 100 through bottom 64 of lower decanter 54 of column 50.

Optionally, a pulsation system 70 can be connected to stripping column 50 at the bottom.

It should be emphasized that standard columns can have any number of inlets for both liquid phases, but the only possible outlets are from the top for the lighter phase and from the bottom for the heavier phase. This is the reason why a standard column is limited to perform only one task, e.g., either extraction or scrubbing or stripping, or more than one task only if any of the liquid phases, heavy phase or light phase, is introduced to the column in more than one inlet, and is allowed to mix with the same kind of liquid phase, heavy phase or light phase, which is introduced through the other inlets, leaving the column together, the light phase at the top of the column and the heavy phase at the bottom of the column. It cannot perform more than one task in cases where each task requires a different heavy phase and which are not allowed to mix with each other inside the column. This since there is no practical way to separate and withdraw the heavy phase from any desired point in the middle of the column.

The present invention overcomes this significant limitation, such that two or more tasks, and even an entire extraction process, can be performed in a single, integrated column.

Figure 3:
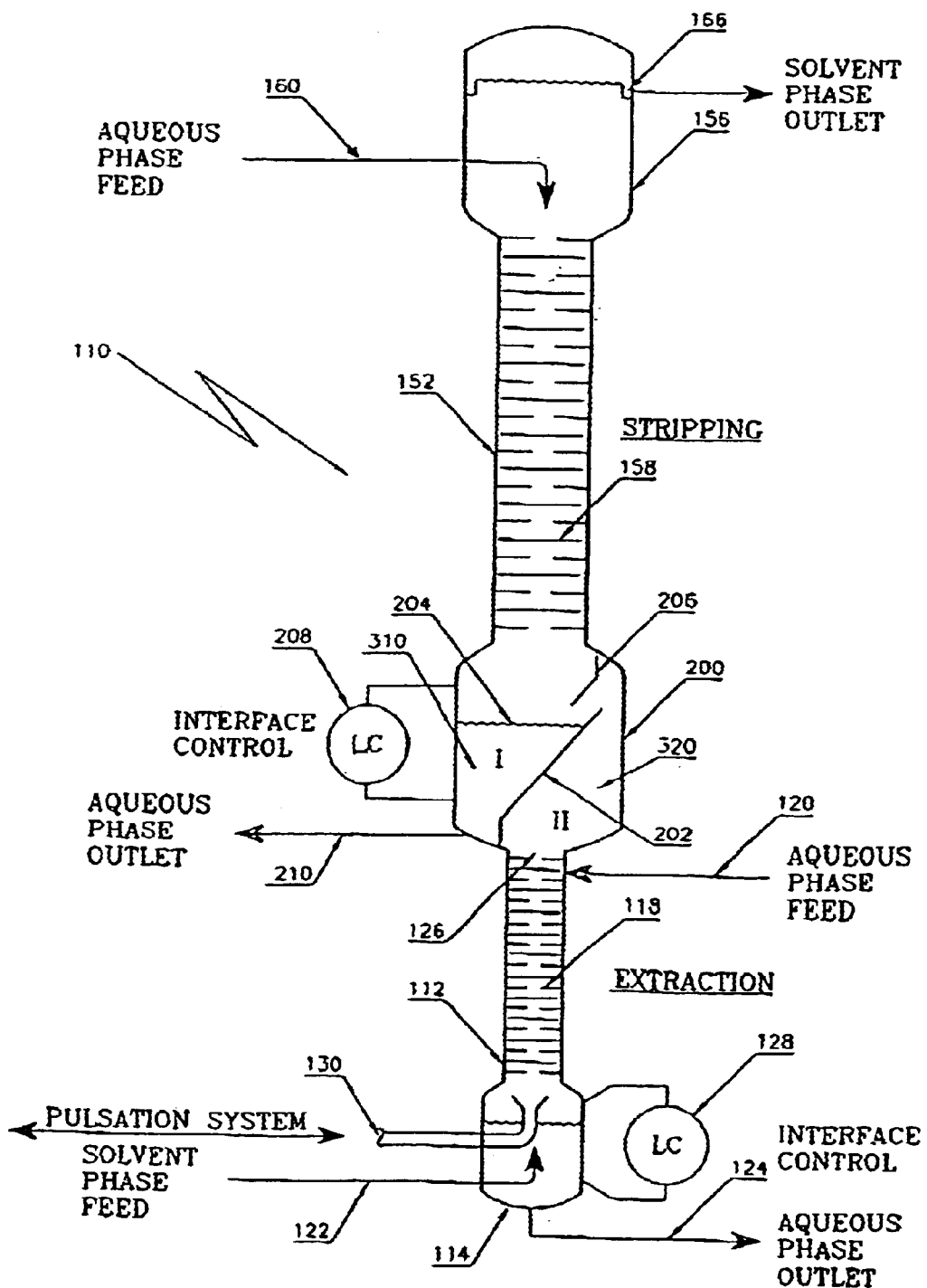
FIG. 3 is a schematic diagram of a single integrated column for solvent extraction and scrubbing or stripping of the extract, according to the present invention.

An integrated column for solvent extraction and stripping, in which the extraction is located below the stripping, is illustrated by way of example in FIG. 3. It is emphasized here that the stripping could also be located below the extraction. An integrated column 110 consists of a vertical cylindrical extracting section 112 connected to a lower decanter 114 disposed underneath extracting section 112, and to an intermediate decanter 200 disposed on top of extracting section 112, a vertical cylindrical stripping section 152 disposed in between intermediate decanter 200 and an upper decanter 156, and communicating therewith.

Extracting and stripping sections 112 and 152 are filled, by way of example, with packing elements 118 and 158, respectively. Diameters, heights and spacing between packing elements 118 and 158, respectively, in sections 112 and 152, respectively, are determined by the characteristics of the liquids and desired extraction and stripping flowrates and fluxes. Therefore, the dimensions of sections 112 and 152 are not necessarily identical, and in fact may be of greatly different magnitudes and proportions in order to assure satisfactory linear velocities, turbulence, contact, and maximal extraction and stripping efficiency.

The extraction and stripping stages performed in integrated column 110 substantially resemble operation in two separate columns. Aqueous solution, by way of example, containing the component to be extracted is fed through inlet 120 at the top of extraction section 112, and is withdrawn, after extraction, through outlet 124 of the lower decanter 114. The solvent introduced through inlet 122 to section 112, flows upwardly through extraction section 112, and the solvent effluent exits via outlet 126 at the top of extraction section 112 and is thus introduced to intermediate decanter 200.

In stripping section 152, another aqueous liquid is fed through inlet 160 to stripping section 152. This aqueous liquid is contacted in counter-current fashion with the same up-flowing solvent from extraction section 112, and flows out of section 152 into intermediate decanter 200.

The solvent, after the stripping operation, overflows via a weir 166 in upper decanter 156, out of integrated column 200 and may then be recycled to solvent inlet 122.

Figure 4:
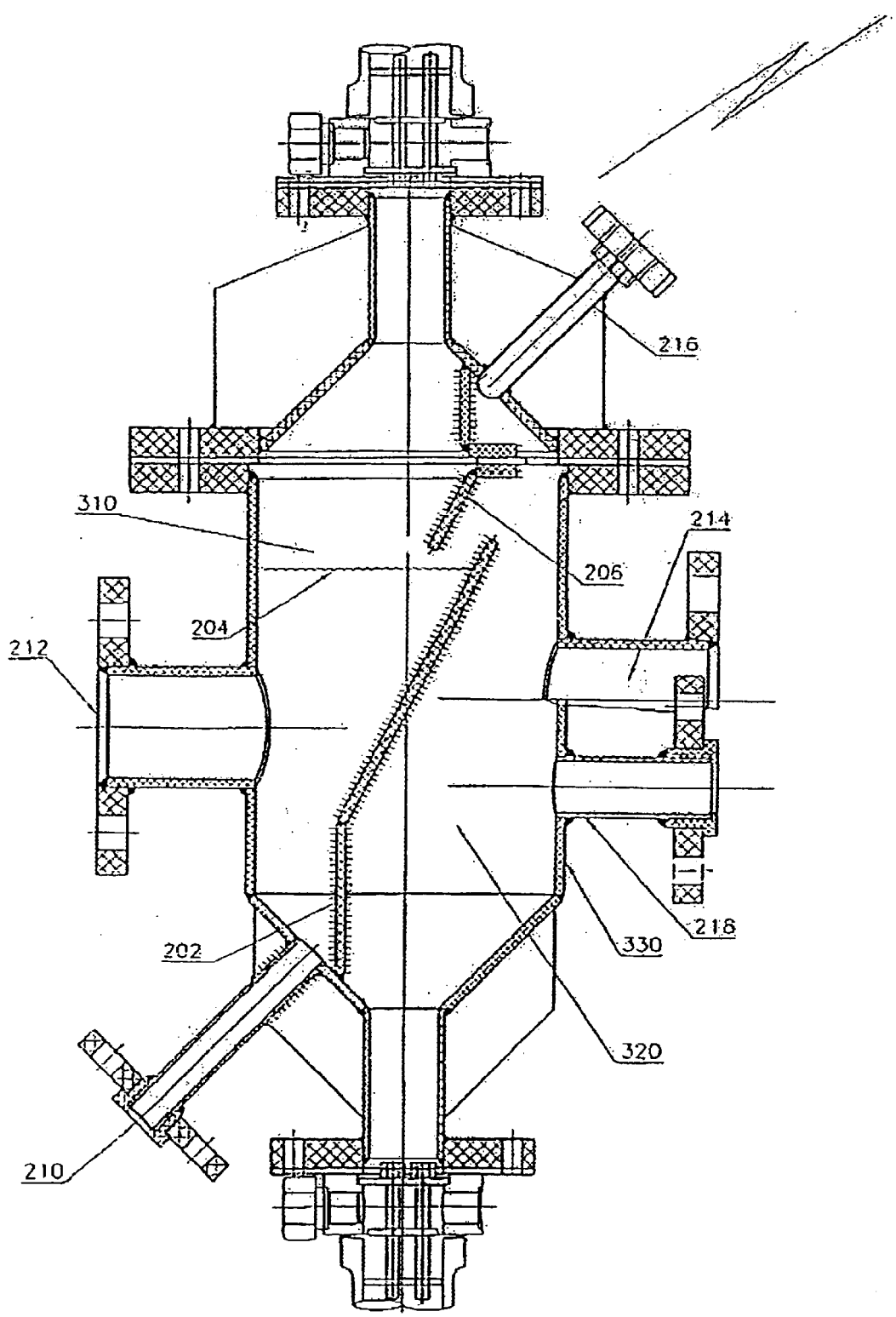
FIG. 4 is schematic diagram of the inventive intermediate decanter in an integrated column.
Figure 5:
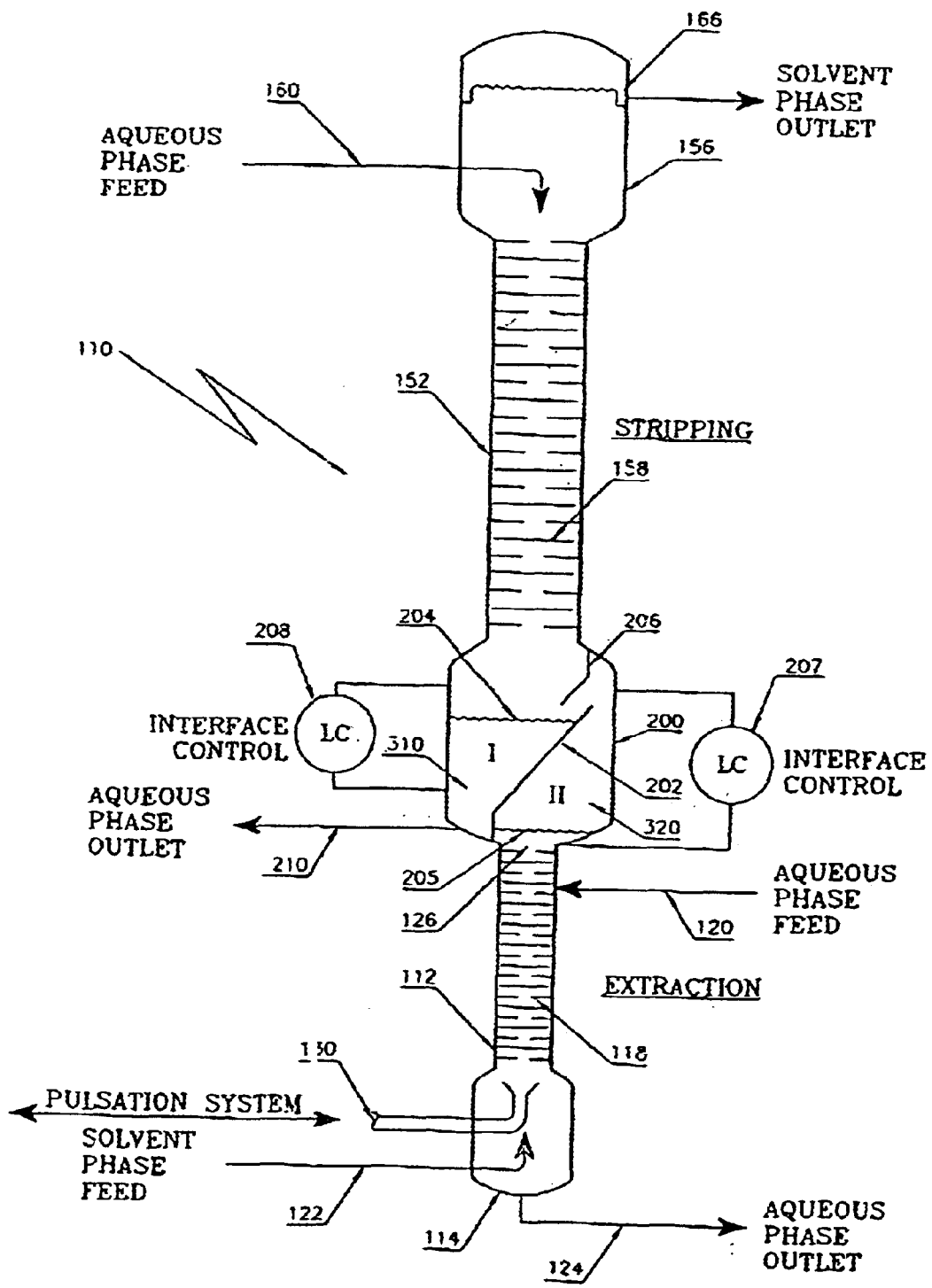
Figure 6:
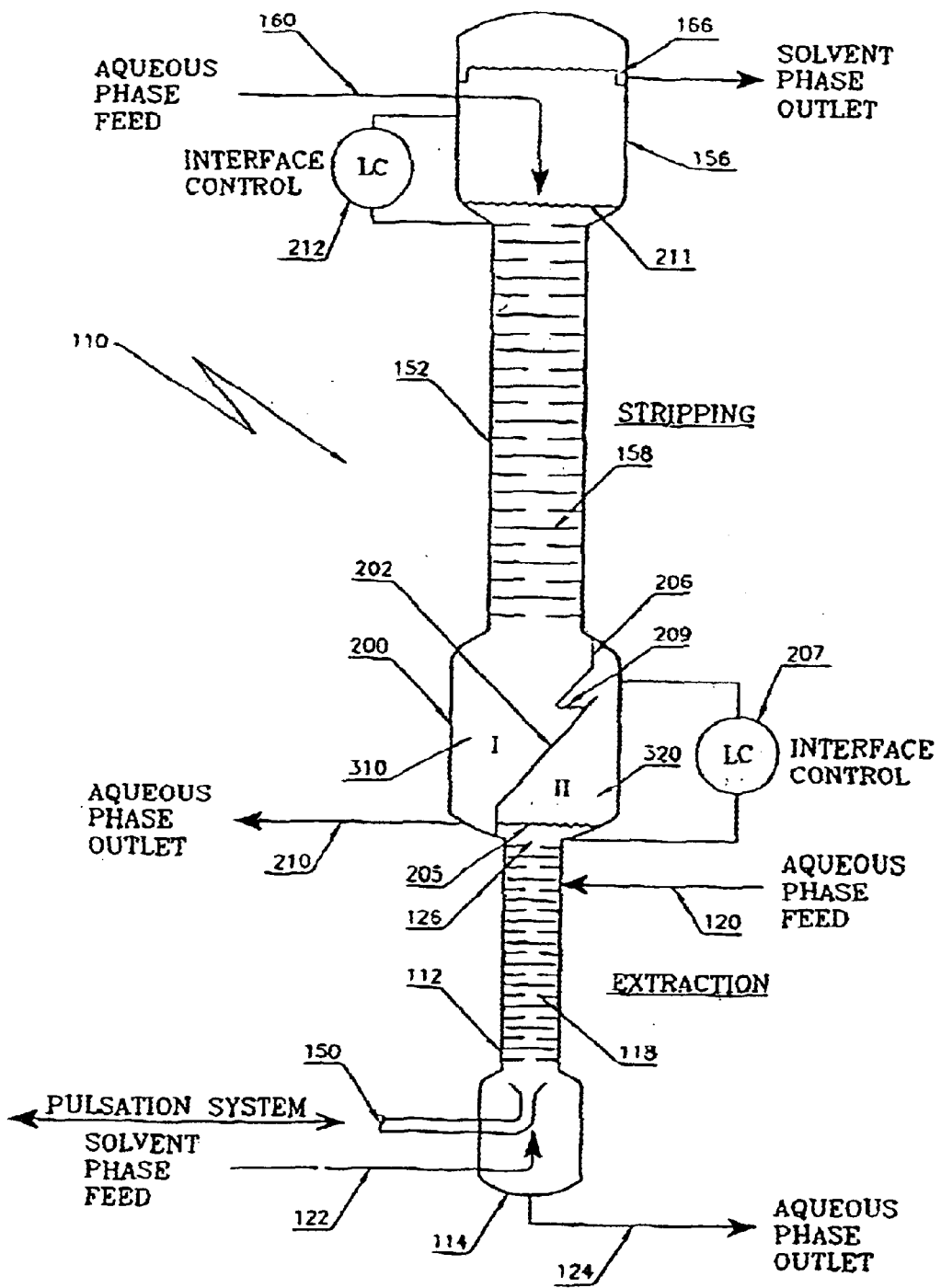

Intermediate decanter 200, schematically illustrated in FIG. 4, is designed and configured to separate between the enriched solvent from extracting section 112 and the enriched aqueous phase from stripping section 152. This enriched aqueous phase is discharged of integrated column 110 at a lower outlet 210 of intermediate decanter 200.

Separation in intermediate decanter 200 depends, to a large extent, on intrinsic physical characteristics, such as density differences, viscosity and surface tension of each of the liquids, and on technical characteristics (e.g., dimensions, flowrate, etc.). Intermediate decanter 200 should provide adequate space for control of the interface 204, which will assure efficient separation with a discharged aqueous phase being substantially free of entrained solvent, and simultaneously permit suitable passage of solvent from the extraction section 112 to the stripping section 152.

Separation is achieved by means of a separating wall 202, preferably designed such that the full cross-section of extracting section 112 is below wall 202, and the full cross-section of the stripping section 152 is above it. The inter face 204 of these two phases is contained by the separation wall 202 that protrudes upwards. To further eliminate any possibility of mixing of the two phases, and to prevent the aqueous phase in stripping section 152 from entering the extracting section 112, an additional protection by a cover wall 206 is inserted beyond separation wall 202, from the top of intermediate decanter 200. Cover wall 206 is disposed in a spaced relationship to a top section of separation wall 202, forming thereby a channel for passage of the light phase from a second settling chamber 320 into a first settling chamber 310.

Thus, separation wall 202 is disposed within intermediate decanter housing 330 so as to form first settling chamber 310 and second settling chamber 320, so as to direct a flow of the light phase received from lower column 112 through second settling chamber 320 and into first settling chamber 310. In second settling chamber 320, the light phase is separated from any entrained heavy phase from the lower column 112, and in first settling chamber 310, the heavy phase from upper column 152 is separated from the light phase. This heavy phase communicates with decanter outlet 210, for discharge thereto, and the light phase communicates and flows into upper column 152.

The height and diameter of intermediate decanter 200, the length and slope angle of the separation wall 202 and the cover wall 206 are determined by the characteristics of the liquids, the required time for coalescence and phase separation in both the bottom of the upper column 152 and the top of the lower column 112, flowrates and fluxes and the desired height of interface 204 in the intermediate decanter 200. This height is controlled by level instrument 208. An additional level control 128 in the system is connected to the lower decanter 114. If necessary, additional measuring or control instruments can be connected to the intermediate decanter 200.

It will be appreciated that other designs for intermediate decanter 200 may be devised by those skilled in the art, providing different shapes and slopes of separating wall 202 and cover wall 206, including means for length adjustment and slope adjustment, or other various partitions that will divide the decanter into two compartments that permit good separation between the two liquids—the heavy phase from the bottom of the upper column 152 and the light phase from the top of the lower column 112.

It will also be appreciated that other designs for intermediate decanter 200 may be devised by those skilled in the art to include a manhole or a hand hole for maintenance, cleaning, and adjustment. If necessary, additional control instruments can be connected to outlets 212, 214, 216 and 218. The intermediate decanter can also be equipped with a relief valve, preferably towards the top of second settling chamber 320, for discharging of any trapped gas. First settling chamber 310 is preferably equipped with a drain valve disposed at the bottom of chamber 310.

If so desired, a pulsation system 130 can be connected to the bottom of the extracting section 112, or to intermediate decanter 200 at any desired point, as two pulsation systems, the pulsation of which may be synchronized.

The ability of the integrated column which is based on the intermediate decanter 200, of the present invention, to perform the entire operation of solvent extraction plant, extracting as well as stripping or scrubbing, in a single column has many technical and economical advantages. Investment costs significantly decrease due to the decrease in the number of columns, decanters, and auxiliary equipment: tanks, pumps, piping, pulsation systems, control instruments etc. and thus spare parts and materials inventories are also reduced relative to a standard prior art plant. At the same time the requisite area for the plant is substantially reduced. Operating and maintenance costs also decrease due to less pumping between columns and less equipment in operation. In addition, operational safety and ecology are improved due to less solvent volumes required for the integrated 110 column as compared to two separate columns of same functionality, and simpler operation and control.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An intermediate decanter in a liquid-liquid contacting system, the decanter being disposed between an upper contacting column and a lower contacting column, the decanter comprising:
   (a) a housing having:
      (i) a top opening communicating with the upper column;
      (ii) a bottom opening communicating with the lower column;
      (iii) a decanter outlet, said outlet designed and configured for discharging a substantially heavy phase of the upper contacting column therefrom, and
   (b) a first partition disposed within said housing so as to form a first settling chamber and a second settling chamber, said first partition designed and configured within said housing so as to direct a flow of a substantially light phase received from the lower column through said second settling chamber and into said first settling chamber, wherein said light phase is separated from said heavy phase of the upper column, such that said heavy phase is in communication with said decanter outlet, for discharge thereto, and said light phase is in communication with the upper column, for discharge thereto.

2. The intermediate decanter of claim 1, wherein said first partition is further disposed within said housing such that said light phase is separated in said second settling chamber from a second heavy phase.

3. The intermediate decanter of claim 1, wherein said first partition is attached to said housing so as to fluidly separate the intermediate decanter, between a bottom region of said first settling chamber and a second bottom region of said second settling chamber.

4. The intermediate decanter of claim 1, wherein said first partition is attached to said housing so as to separate between said light phase in said second settling chamber and said heavy phase disposed in said first settling chamber and in fluid communication with said decanter outlet.

5. The intermediate decanter of claim 1, wherein said first settling chamber has a liquid-liquid interface, below which is disposed said substantially heavy phase, the intermediate decanter further comprising:
(c) means for controlling a level of said interface.

6. The intermediate decanter of claim 5, wherein said means for controlling is designed to maintain said level below a pre-determined height of said first partition.

7. The intermediate decanter of claim 6, wherein said first partition is attached to said housing so as to separate between said light phase in said second settling chamber and said heavy phase disposed below said interface.

8. The intermediate decanter of claim 1, wherein at least a portion of said first partition is sloped.

9. The intermediate decanter of claim 1, further comprising:
(c) a second partition disposed in a spaced relationship to a top section of said first partition, forming thereby a channel for passage of said substantially light phase from said second settling chamber into said first settling chamber.

10. The intermediate decanter of claim 9, wherein said first settling chamber has a liquid-liquid interface, below which is disposed said substantially heavy phase, the intermediate decanter further comprising:
(d) means for controlling a level of said interface, wherein said means for controlling is designed to maintain said level below a pre-determined height of said first partition.

11. The intermediate decanter of claim 10, wherein said means for controlling is designed to maintain said level a pre-determined height below said second partition.

12. The intermediate decanter of claim 9, wherein said second partition is designed and configured to be length-adjustable.

13. The intermediate decanter of claim 9, wherein said second partition is designed and positioned to inhibit said substantially heavy phase from passing between said second partition and said housing and into said second settling chamber.

14. The intermediate decanter of claim 1, further comprising:
(c) at least one opening for attaching a level control instrument.

15. The intermediate decanter of claim 14, further comprising:
(d) at least one additional opening for attaching instruments, said instruments selected from the group consisting of indicating instruments and control instruments.

16. The intermediate decanter of claim 14, further comprising:
(d) at least one additional opening, disposed in said housing near a top of said second settling chamber, for releasing of air trapped below said second partition.

17. The intermediate decanter of claim 14, further comprising:
(d) at least one additional opening, disposed in said housing near a bottom of said first settling chamber, for draining any liquid in said first settling chamber.

18. An integrated column for performing a plurality of liquid-liquid contacting functions, the column comprising:
(a) an upper column section;
(b) a lower column section, and
(c) an intermediate decanter fluidly connecting between said upper column section and said lower column section, said intermediate decanter including:
(i) a housing having:
A. a top opening communicating with said upper column section;
B. a bottom opening communicating with said lower column section, and
C. a decanter outlet, said outlet designed and configured for discharging a substantially heavy phase therefrom; and
(ii) an inner workings including:
a first partition designed and configured within said housing so as to form a first settling chamber and a second settling chamber, and so as to direct a flow of a substantially light phase received from said lower column section through said second settling chamber, wherein said light phase is separated from said heavy phase of said lower column section, and into said first settling chamber, wherein said light phase is separated from said heavy phase of said upper column section, such that said heavy phase is in communication with said decanter outlet, for discharge thereto, and said light phase is in communication with said upper column section, for discharge thereto.

19. The integrated column of claim 18, further comprising:
(d) means for flowing said substantially light phase from said lower column section, through said intermediate decanter, and into said upper column section.

20. The integrated column of claim 18, wherein at least a portion of said first partition is sloped.

21. The integrated column of claim 18, further comprising:
(d) a pulsation system including at least one pulsation generator, each said generator being connected to the integrated column, said pulsation system for promoting liquid-liquid contacting.

22. The integrated column of claim 18, wherein said first partition is attached to said housing so as to fluidly separate a bottom region of said first settling chamber and a second bottom region of said second settling chamber.

23. The integrated column of claim 18, wherein said first settling chamber has a liquid-liquid interface, below which is disposed said substantially heavy phase, said intermediate decanter further including:
(d) means for controlling a level of said interface.

24. The integrated column of claim 23, wherein said means for controlling is designed to maintain said level below a pre-determined height of said first partition.

25. A method for performing a plurality of liquid-liquid contacting operations in an integrated column, the method comprising the steps of:
(a) providing an integrated column including:
 (i) an upper column section;
 (ii) a lower column section;
 (iii) an intermediate decanter fluidly connecting between said upper column section and said lower column section, said intermediate decanter including:
  (A) a housing having:
   I. a to p opening communicating with said upper column section;
   II. a bottom opening communicating with said lower column section, and
   III. a heavy phase outlet, and
  (B) a first partition disposed within said housing, said first partition forming a first settling chamber and a second settling chamber;
(b) flowing a light phase through said lower column section and through said upper column section via said second settling chamber and said first settling chamber;
(c) performing a first liquid-liquid contacting operation in said upper column section by passing a first heavy phase through said upper column section to said first settling chamber, and
(d) selectively removing said first heavy phase from said heavy-phase outlet.

26. The method of claim 25, further comprising the step of:
(e) performing a second liquid-liquid contacting operation in said lower column section by flowing a second heavy phase through said lower column section.

27. The method of claim 26, wherein any of said second heavy phase flowing into said second settling chamber by entrainment is settled in said second settling chamber.

28. The method of claim 26, wherein said second liquid-liquid contacting operation is selected from the group consisting of solvent extraction, scrubbing, stripping, washing, re-extraction and reacting.

29. The method of claim 28, wherein said first liquid-liquid contacting operation and said second liquid-liquid contacting operation are different contacting operations.

30. The method of claim 25, further comprising the step of:
(e) controlling a liquid-liquid interface within said first settling chamber.

31. The method of claim 30, wherein said controlling maintains a level of said interface below a pre-determined height of said first partition.

32. The method of claim 25, further comprising the step of:
(e) providing a second partition disposed in a spaced relationship to a top section of said first partition, forming thereby a channel for passage of said substantially light phase from said second settling chamber into said first settling chamber.

33. The method of claim 32, wherein said controlling maintains a level of said interface below a pre-determined height of said second partition.

34. The method of claim 25, further comprising the step of:
(e) disposing said first partition within said housing so as to fluidly separate between a first bottom region of said first settling chamber and a second bottom region of said second settling chamber.

35. The method of claim 34, wherein at least a portion of said first partition is sloped.

36. The method of claim 34, wherein said flowing of said first heavy phase through said upper column section is achieved by gravitation.

37. The method of claim 25, wherein said first liquid-liquid contacting operation is selected from the group consisting of extraction, scrubbing, stripping, washing, re-extraction and reacting.

38. An integrated column for performing a plurality of liquid-liquid contacting functions, the column comprising a plurality of units, each of said units including:
(a) a column section, and
(b) an intermediate decanter fluidly connected to a first end of said column section,
wherein said units are attached in series, such that each said intermediate decanter in the integrated column is connected to an upper column section and a lower column section, and wherein each said intermediate decanter includes:
 (i) a housing having:
  A. a top opening communicating with said upper column section;
  B. a bottom opening communicating with said lower column section, and
  C. a decanter outlet, said outlet designed and configured for discharging a substantially heavy phase therefrom; and
 (ii) an inner workings including:
  a first partition designed and configured within said housing so as to form a first settling chamber and a second settling chamber, and so as to direct a flow of a substantially light phase received from said lower column section through said second settling chamber, wherein said light phase is separated from said heavy phase of said lower column section, and into said first settling chamber, wherein said light phase is separated from said heavy phase of said upper column section, such that said heavy phase is in communication with said decanter outlet, for discharge thereto, and said light phase is in communication with said upper column section, for discharge thereto.

* * * * *